UNITED STATES PATENT OFFICE.

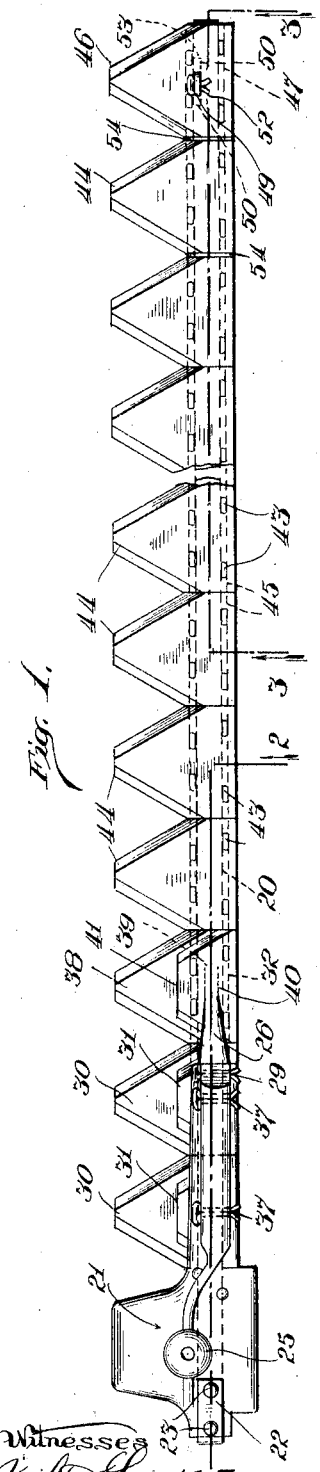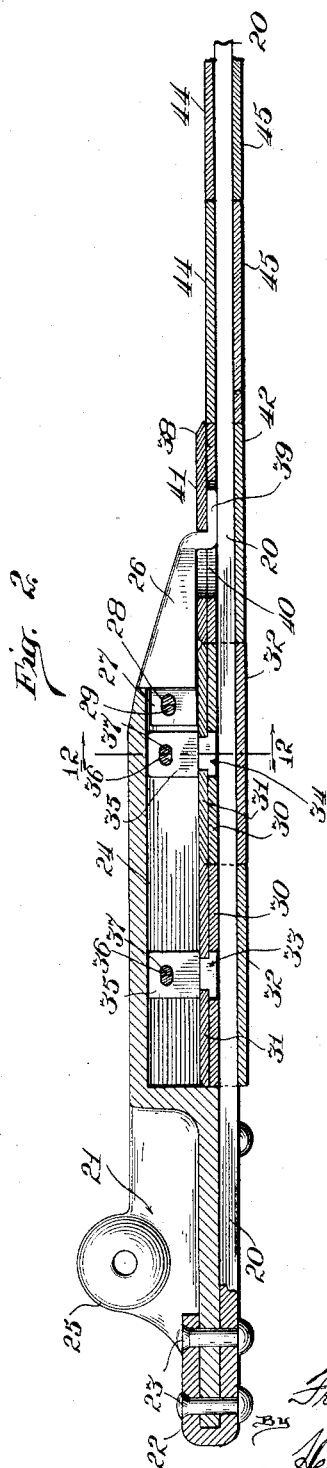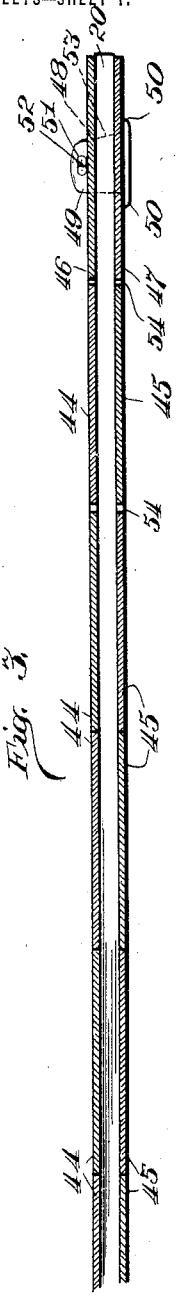

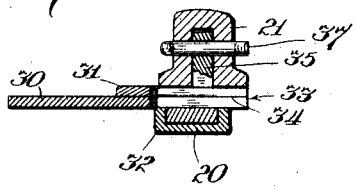
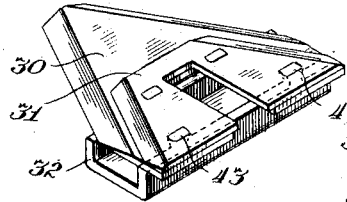
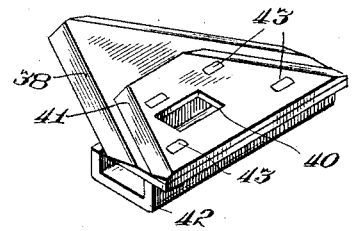
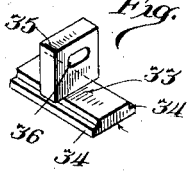
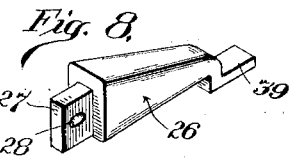
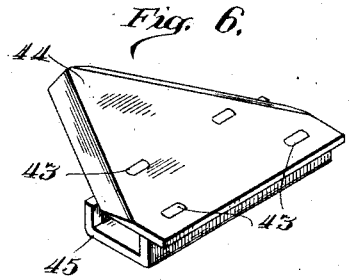
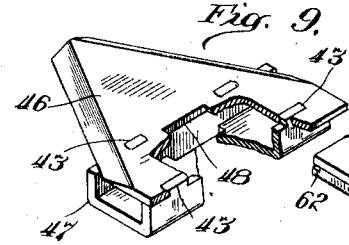
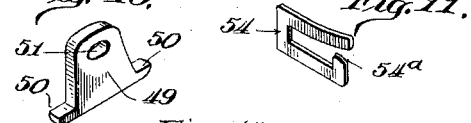
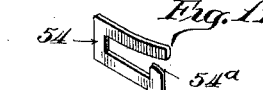
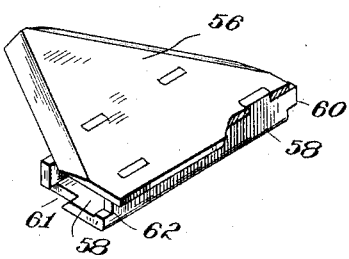
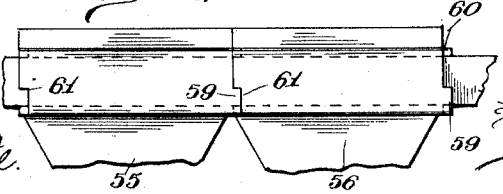

FREDERICK BERGMAN, OF CHICAGO, ILLINOIS, ASSIGNOR OF ONE-THIRD TO AMUEL B. SPACH, OF CHICAGO, ILLINOIS.

SICKLE OR KNIFE.

1,390,753.  Specification of Letters Patent.  Patented Sept. 13, 1921.

Application filed October 4, 1919. Serial No. 328,474.

*To all whom it may concern:*

Be it known that I, FREDERICK BERGMAN, a citizen of the United States, and a resident of Chicago, in the county of Cook and State of Illinois, have invented certain new and useful Improvements in Sickles or Knives, of which the following is a description, reference being had to the accompanying drawings, which form a part of my specification.

My invention relates to the sickle or cutting knife more especially intended for use on mowers, reapers, and the like; and has for its object the provision of a construction wherein the serrated knife or sickle will comprise a plurality of independent sections or blades removably secured in proper relation with one another so as to permit the ready removal of any one or all of the sections or blades for the purpose of repair and the grinding or sharpening of the respective sections or blades.

The objects and advantages of my improved construction will be more readily comprehended from the following detailed description of the drawings, wherein:—

Figure 1 is a top plan view of my improved sickle or knife.

Fig. 2 is an enlarged longitudinal sectional view, taken on the line 2—2 of Fig. 1.

Fig. 3 is an enlarged longitudinal sectional view, taken on the line 3—3 of Fig. 1.

Fig. 4 is a perspective view of the blade or section employed at the inner or connected end of the sickle.

Fig. 5 is a perspective view of the blade or section adapted to be secured adjacent to the blade disclosed in Fig. 4.

Fig. 6 is a perspective view of the style of blades or sections employed throughout the main portion or length of the sickle; namely intermediate of its ends.

Fig. 7 is a perspective view of the locking means or key, employed in connection with the type of blade or section shown in Fig. 4.

Fig. 8 is a perspective view of the removable tip or end of the sickle-head; namely the portion which engages with the blade or section shown in Fig. 5.

Fig. 9 is a perspective view of the blade adapted for the outer end of the knife or sickle.

Fig. 10 is a perspective view of the locking means or key employed in connection with the blade or section shown in Fig. 9, whereby the blade or section is locked to the knife-bar or sickle-back.

Fig. 11 is a perspective view of a type of spacer or washer adapted to take up any play between the respective blades or sections, and to provide proper spacing of the blades or sections relative to the ends of the knife-bar or sickle-back.

Fig. 12 is a cross-sectional view, taken on the line 12—12 of Fig. 2, looking in the direction of the arrows.

Fig. 13 shows a modified form of my improved removable blades or sections; the figure illustrating two blades in perspective.

Fig. 14 is a detail view of a portion of a sickle with the blades illustrated in Fig. 13, showing the same in assembled relation on a portion of the knife-bar.

My improved knife or sickle is especially intended for use in connection with reapers, mowers, or similar harvesting machinery; and in its specific exemplification as disclosed in the drawings, comprises the long knife-rod or sickle-back 20 which is of a length commensurate with the size of the knife or sickle, that is the bar or back 20 may be of any desired length to receive the desired number of blades or sections. The inner end of the rod or back 20 is preferably secured to the lower side of the attaching head or casting 21; with the adjacent inner end of the rod or back 20 shown bent upwardly so as to overlap the head as shown at 22 in Fig. 2, to which it is preferably riveted as shown at 23, thereby providing a very firm and rigid construction. The attaching head is preferably provided with an extension disposed along the upper side of the knife or sickle so as to reinforce the inner end of the knife; and this extension, which is of predetermined length, is provided with a channel 24 extending lengthwise thereof; while the extension is formed so as to be in slight spaced relation with the bar or back 20 a distance commensurate with the thickness of the knife-sections or blades which are threaded on the knife-bar or sickle-back at what may be termed the inner end of the knife or sickle. The head 21 is shown provided with a spherical portion 25 to which the connecting rod or pin is adapted to be secured whereby the entire knife or sickle is reciprocated, as is usual with knives or sickles of the class to which my invention relates. The outer end of the projection of the head is preferably provided with a removable toe or tip 26, one end whereof is provided with a lug or extension 27 adapted to extend into the longitudinal slot 24 of the main portion of the extension of the head; and the lug 27 is provided with a pin-receiving aperture 28, see Fig. 8, which is adapted to register with similar apertures or holes extending transversely through the channeled extension of the head to receive a suitable cotter-pin or other locking means as shown at 29 in Fig. 1.

The knife-blades or sickle-sections 30, 30 are both preferably similar in construction and have their upper surfaces shown provided with a reinforcing plate as at 31 in Fig. 4; while the lower sides or surfaces are each provided with a loop or channel 32 preferably disposed throughout the width of the blades and adapted for the passage of the knife-bar or sickle-back 20 as shown in Fig. 2. The blades of these two sections 30, as well as the reinforcing plates 31, are slotted lengthwise of the sections or knife-blades, that is in a direction transversely of the sickle proper, to receive a key or locking means 33 shown in detail in Fig. 7. The slot in the knife-blade proper is preferably of somewhat greater width than the slot in the reinforcing plate 31 in order that the slot in the blade proper may receive the laterally extending shoulders 34 of the key 33 which is adapted to slide across the top of the channel portion or loop 32 and therefore across the top of the knife-bar or sickle-back 20, as shown in Fig. 2; while the upper portion of the key 33 is of width commensurate with the slot in the reinforcing plate 31. The upper portion of the keys 33 are each provided with an upwardly disposed projection or lug 35 adapted to extend into the longitudinal slot 24 of the head extension as shown in Fig. 2. The extension or lug 35 of the keys 33 for the two sickle-sections or knife-blades 30 are each provided with a hole or slot 36, preferably slightly elongated, adapted to register with holes disposed transversely through the channeled extension of the head to receive locking or cotter-pins as shown at 37 in Fig. 1, whereby the two sickle-sections or knife-blades 30 will be securely held in place against movement longitudinally of the knife-bar or sickle-back 20.

The channeled extension of the head is preferably of such length as to overlap substantially both inner knife-blades or sickle-sections 30 as shown in Figs. 1 and 2; while the removable toe or tip 26, when secured in place, is adapted to partially overlap the third sickle-section or knife-blade 38, as shown in Figs. 1 and 2. The outer end of the toe or tip is provided with a downwardly and forwardly projecting portion 39, see Figs. 2 and 8, which is adapted to be inserted into a slot 40 formed in the sickle-section or knife-blade 38. The blade or section 38, like blades 30, is also preferably provided on its upper face with a reinforcing plate 41; while the lower side is provided with a loop or channel 42 similar to the channel 32 on the sickle-sections or knife-blades 30; the reinforcing plates 31 and 41, as well as the channels 32 and 42 being riveted in place as clearly shown at 43 in Figs. 4 and 5. The slot 40 in the section or blade 38 is shown disposed transversely of the blade that is lengthwise of the channel 42; with the slot in the blade proper made of somewhat greater length than the slot in the reinforcing plate 41 so as to receive the forward projection 39 of the tip or toe 26 and thus provide a firm holding relation between the toe or tip 26 and the blade when the same have been properly assembled.

The remaining sickle-sections or knife-blades 44, with the exception of the outer sickle-section or knife-blade, are all similar in construction and consist of the blade portion, each provided with a channel or loop 45 on the lower side thereof as shown in Fig. 6, preferably riveted into place as shown at 43, with the channels 45 preferably of the same length as the width of the blades and formed to receive the knife-bar or sickle-back 20 as shown in Figs. 1 and 2.

After the sickle-sections or knife-blades 30 and 38 have been put into place or "threaded" onto the bar as described, a sufficient number of sickle-sections or knife-blades 44 are then "threaded" onto the knife-bar or sickle-back 20; and these intermediate sections or blades will be firmly held on the knife-bar or sickle-back 20 by the end blade 46 shown in Fig. 1 and in perspective in Fig. 9.

The knife-blade or sickle-section 46, like the other knife-blades, is provided with a loop or channel 47, riveted or otherwise secured thereto, as shown at 43, and preferably extending throughout the width of the blade and formed to receive the knife-bar or sickle-back 20. The blade 46 and the channel 47 thereof are both provided with a slot 48 adapted to receive a key 49 shown in perspective in Fig. 10; the key on its lower end being provided with shoulders or extensions 50 disposed beyond the slot in the channel 47 of the knife-blade or section so as to overlap the same and prevent further passage of the key through the slot 48 in the knife-blade 46 and channel 47. The key 49 is adapted to extend slightly beyond the upper surface of the knife-blade, as shown in Fig. 3; with the extended upper portion provided with a pin-receiving hole 51 adapted for the passage of a locking or cotter-pin, as shown at 52 in Figs. 1 and 3, whereby withdrawal of the key is prevented. The outer end of the knife-bar or sickle-back 20 has its forward longitudinal side provided with a recess or slot 53 adapted for the passage of the key 49, so that when the key 49 has been passed through the slot 48 in the sickle-section or knife-blade 46, after the latter has been strung or threaded onto the knife-bar or back 20, longitudinal movement of the knife-blade 46 will be prevented.

It is evident from the construction shown and described that after the section or blade 46 has been put into place, movement of the respective sections or blades lengthwise of the bar or back 20 will be prevented and a rigid knife or sickle provided; the knife-bar or sickle-back 20 being reinforced by the channel sections of the respective blades.

As there may be slight variations in the width of the blades or length of the rod or bar, I provide the rectangular shaped washers 54 shown in perspective in Fig. 11 and inserted into place in Fig. 1. With these washers, any play between the blades or sections may be taken up and proper register between the respective slots and pin-receiving apertures provided. In practice, the washers 54, which are adapted to slip onto the knife-bar or sickle-back 20, as shown, may be placed at any point on the knife-bar, being preferably disposed at the inner end thereof; although the positioning of the washers, as will be readily understood, is optional.

The knife-blade or sections 30, 30 and 38, with their reinforcing plates 31 and 41, respectively, are of a thickness corresponding with the distance between the knife-bar or back 20 and the head projection so as to be in firm relation therewith when the respective sections or blades have been passed or threaded onto the knife-bar 20.

As is apparent from the construction shown and described, the sections or blades may not only be quickly assembled and put into place, but the respective sections or blades may be readily removed for the purpose of repair or sharpening when occasion requires. It is also evident that considerable time and expense will be saved by my improved construction over the constructions heretofore employed, wherein the respective sickle-sections or blades have been riveted and permanently secured to the knife-bar or back, as the former construction necessitated the entire knife or sickle to be removed and sent away for repair in the event of one or more of the knife-blades or sickle-sections becoming broken. Furthermore, it is evident that the knife-blades or sickle-sections may be more conveniently handled, ground or sharpened, as each knife-section or blade may be independently handled and ground or sharpened, thus obviating the cumbersome method heretofore employed, namely requiring the entire sickle to be removed and handled during the sharpening operation.

In Figs. 13 and 14, wherein a pair of intermediate knife-blades 55 and 56 are shown, I disclose a slight modified form of my knife-blades or sections. Each section is provided with a channel 57 and 58, respectively, adapted to receive the knife-bar or sickle-back 20 as in the previously described construction; with the ends of the channels correlatively tongued and slotted so as to provide an interlocking relation between the ends of the respective channels of the abutting or adjacently placed blades; that is to say one end of the channel of each blade or knife-section is provided with the extensions or lips 59 and 60 at diagonally opposite sides, adapted to extend into corresponding slots 61 and 62 formed at diagonally opposite sides in the apposite end of the channel of an adjacently placed knife blade, as clearly shown in Fig. 14, where a portion of two knife-blades are shown in bottom plan to disclose the interlocking method of the tongues and slots formed in the channel portions of adjacently placed blades or sections. With the construction shown in Figs. 13 and 14, the sickle-sections or knife-blades will be interlocked with one another and as a result a very rigid structure provided. It will be understood, of course, that the inner and outer end sickle-sections or blades, so far as slot and key construction is concerned, are to be made similar to the blades or sections 30, 38 and 46.

The key 49 is preferably shown with an inclining side, see Fig. 10, and for that reason one end of the slot 48 in the end blade or section 46 is inclined in a similar manner as is also the end of the slot 53 adjacent the outer end of the bar 20. With this construction, it is evident when the key 49 is forced through the registering slots in the knife-blade or section and the bar, the blade or section will be forced toward the adjacent blade or section and therefore into firm abutting relation therewith, so that all of the blades or sections of the knife or sickle will be maintained in firm contact with one another.

The knife-bar or sickle-back 20 may be readily removed from the connecting-head 21 by merely removing the rivets 23, should occasion require, although there would be no occasion for doing so, except in case of breakage. It is also evident that my improved sickle or knife may quickly be substituted for the present type of unit sickle or knife without requiring any material change in the general mower or reaper construction, except possibly in providing a somewhat deeper channel or groove in the usual guide-bar or fingers which are arranged above the sickle and through which the respective knife-blades or sickle-sections reciprocate.

I prefer to make the washer 54 with a split end, as shown in Fig. 11; that is with one of the short sides or ends split or disconnected from the elongated side as shown at 54ª. These washers are made of resilient metal, permitting the split ends to be forced apart and thus enable the washers to be inserted onto the sickle-back or knife-bar 20 intermediate of the respective knife-blades or sickle-sections without necessitating the removal of all of said sections from the knife-bar or back; the blades, of course, being sufficiently separated to permit the washer 54 to be forced onto the bar. As previously stated, the washers 54 are employed for the purpose of taking up any slight play between the respective blades or sections, causing a proper register of the slot in the outer end section with the slot in the knife-bar or sickle-back and inducing a snug relation between the respective blades so as to prevent the grass or grain from wedging between adjacently placed blades or sickle-sections.

With the tip or toe 26 provided with the downwardly and forwardly projecting end 39 adapted to extend into the slot of the knife-blade or section 38 so as to have the extension 39 overlapped by the reinforcing plate on said knife-blade or section, it is evident that the knife or sickle is not only reinforced at the inner end, but the interlocking arrangement of the toe or tip with the knife-blade or sickle-section will also prevent the wedging of any grass or grain between the knife-blades and the extension of the knife or sickle-head.

I have shown and described what I believe to be the simplest and best exemplifications of my invention, but certain modifications may be made without, however, departing from the spirit of my invention.

What I claim is:—

1. A sickle of the character described, comprising a head, a bar secured at one end to said head, a portion of said head being arranged to extend parallel with said bar and provided with an elongated slot disposed above said bar, a plurality of blades or sections formed to be slid onto said bar, the blades or sections at the head-end of the bar being provided on their upper faces with slots, removable keys adapted to extend into the slots in said blades and into the slot in said head and to be secured thereto, and means whereby the outer end blade or section is removably secured to said bar.

2. A sickle of the character described, comprising a bar, a plurality of blades or sections provided with loops or channels on one of the faces thereof so as to permit the blades or sections to be slid onto said bar, the sides of the blades intermediate of the inner and outer ends of the sickle being provided with correlated slots and extensions, each side of said blades having a pair of extensions, with the extensions at one side being diagonally opposite to those at the other side, while one of the extensions at each side is provided with a beveled edge, adapting the extensions of one blade to form interlocking engagement with the slots and the beveled extensions of an adjacent blade, and a wedge-shaped key adapted to pass through slots in the outer end blade and the bar for locking the blades or sections in place.

3. A sickle of the character described, comprising a bar provided with a slot adjacent the outer end thereof, a plurality of blades or sections provided with loops or channels on one of the faces to permit the blades to be slid onto the bar, the ends of the channels of each blade being provided with corresponding slots and extensions, the extensions at one end being diagonally opposite to those of the other end, adapting the extensions of one blade to form interlocking engagement with the slots of an adjacent blade, while the outer blade is provided with a slot disposed therethrough from top to bottom, and a key adapted to pass through said slot in the end blade and the slot in said bar whereby all of said blades or sections are removably held in place.

4. A sickle of the character described, comprising a bar, a head secured to the inner end thereof and adapted to extend lengthwise of the bar, the extended portion of said head being longitudinally slotted, a plurality of blades formed to slide onto said bar, the blades at the inner end of said bar being slotted in a direction transversely of the bar, keys adapted to slide into said transverse slots and having interlocking relation therewith and to extend into the slot in the head extension to lock said blades in place, and means whereby the outer end blade is removably locked to the bar.

5. A sickle of the class described, comprising a bar, a head secured to the inner end of said bar and provided with a projection adapted to overlap a portion of said bar, said projection being provided with a longitudinal slot, a plurality of blades or sections formed so as to be threaded onto said bar, the upper surfaces of the blades or sections at the inner end of said bar being slotted, means adapted to extend into the slots of said blades or sections and into the longitudinal slot in the projection of said head whereby said blades or sections are firmly secured in place, the outer end of said bar and the outer blade or section being slotted, and removable means adapted to pass through the slots in the outer end of said bar and the outer blade or section whereby said blade or section and the intermediate blades or sections are locked in place.

6. A sickle of the character described, comprising a bar, a plurality of blades or sections, each provided with a loop or channel on one of the faces thereof, whereby the respective blades or sections are threaded onto said bar, the sides of the blades being provided with correlated slots and extensions, with some of the extensions provided with beveled edges to permit adjacent blades to have interlocking relation, a head secured to the inner end of said bar and provided with a projection adapted to overlap the blades or sections at the inner end of the bar, the outer end of said head projection being removable and having a downwardly and forwardly projecting lip, the upper surface of the blade or section registering with said projecting lip being slotted transversely to receive said lip and form interlocking relation therewith, and a slot and key lock for the outer end blade or section.

7. A sickle of the class described, comprising a bar, a head secured to the inner end of said bar and provided with a projection adapted to overlap a portion of said bar, the outer end of said projection being removable and provided with a downwardly and forwardly projecting lip, a plurality of blades or sections formed so as to be threaded onto said bar, the upper surface of the blade or section registering with said removable end being slotted transversely to receive said lip and form interlocking relation therewith, and a slot and key lock for the outer end blade or section whereby all of said blades or sections are removably locked in place.

8. A sickle of the character described, comprising a bar, a head secured to the inner end of said bar and provided with a longitudinal extension disposed lengthwise of the upper face of said bar and having a channel extending lengthwise thereof, a plurality of blades or sections provided with passages extending transversely thereof and of cross-sectional configuration similar to the cross-sectional configuration of said bar whereby the blades or sections may be slid onto said bar, the blades at the inner and outer ends of the bar being provided with slots, means adapted to form locking engagement with the inner blades and the head-extension, and removable means adapted to extend through the slot in the outer blade or section for locking the latter to said bar.

9. A sickle of the character described, comprising a bar provided with a slot at its outer end, a head secured to the inner end of said bar and formed to extend lengthwise of the upper face of said bar, said extended portion of the head being provided with a longitudinal slot, a plurality of blades or sections formed so as to slide onto said bar, the upper faces of the blades or sections at the inner end of said bar being slotted, keys adapted to slide into the slots in said blades and to be disposed in the longitudinal slot of said head-extension whereby the blades at the inner end of the bar are locked against movement, a removable tip for said head-extension provided with a downward and forward extension adapted to extend into the slot in the upper face of the adjacent blade or section, said tip being provided with a heel or lug adapted to extend into the longitudinal slot of said head-extension and to be locked therein, the outer end blade being provided with a slot disposed therethrough from top to bottom, and a key adapted to pass through the slot in the outer end blade and the slot in said bar for removably holding the blades in place.

FREDERICK BERGMAN.

Witnesses:
GEORGE HEIDMAN,
F. A. FLORELL.